United States Patent [19]
Kazuno et al.

[11] Patent Number: 5,742,579
[45] Date of Patent: Apr. 21, 1998

[54] OPTICAL DISK RECORDING DEVICE AND OPTICAL DISK DRIVE

[75] Inventors: Tadao Kazuno; Toshio Takeuchi; Yoshihiro Sakanushi; Masanori Matsunaga, all of Atsugi, Japan

[73] Assignee: Mitsumi Electric Co., Ltd., Tokyo, Japan

[21] Appl. No.: 815,341

[22] Filed: Mar. 11, 1997

Related U.S. Application Data

[63] Continuation of Ser. No. 412,728, Mar. 29, 1995, abandoned.

[30] Foreign Application Priority Data

| Mar. 30, 1994 | [JP] | Japan | 6-061537 |
| Jun. 8, 1994 | [JP] | Japan | 6-126599 |
| Jun. 14, 1994 | [JP] | Japan | 6-132165 |

[51] Int. Cl.$^6$ ............................................. G11B 7/00
[52] U.S. Cl. ............................................. 369/124
[58] Field of Search ............................ 369/124, 53, 54, 369/47, 58, 59, 60

[56] References Cited

U.S. PATENT DOCUMENTS

| 4,775,969 | 10/1988 | Osterlund | 369/53 |
| 5,161,143 | 11/1992 | Fukushima et al. | 369/53 |
| 5,200,943 | 4/1993 | Sano et al. | 369/59 |
| 5,426,629 | 6/1995 | Saitou et al. | 369/60 |

FOREIGN PATENT DOCUMENTS

| 0429139 | 11/1991 | European Pat. Off. . |
| 0473305 | 3/1992 | European Pat. Off. . |
| 0544299 | 6/1993 | European Pat. Off. . |

OTHER PUBLICATIONS

Patent Abstracts of Japan 17(163), (P-1513) Mar. 1993.

*Primary Examiner*—Nabil Hindi
*Attorney, Agent, or Firm*—Michael N. Meller

[57] ABSTRACT

An optical disk writing device includes an optical disk drive recording data into an optical disk and having no harddisk as a data buffer, and a host computer controlling the optical disk drive and transferring the data to the optical disk drive by using a data storage connected to the host computer as a data buffer for the transferring and the recording.

5 Claims, 14 Drawing Sheets

FIG. 6 PRIOR ART

| DESCRIPTION OF DATA | DATA |
|---|---|
| FIRST MUSIC PIECE NUMBER | 1 |
| LAST MUSIC PIECE NUMBER | 3 |
| STARTING TIME OF READ-OUT PERIOD (MIMUTE, SECOND, FRAME) | 45, 08, 00 |
| STARTING TIME OF FIRST MUSIC PIECE (MIMUTE, SECOND, FRAME) | 00, 02, 00 |
| INDEX (MIMUTE, SECOND, FRAME) 01 | 00, 02, 00 |
| 02 | 05, 00, 00 |
| 03 | 10, 00, 00 |
| STARTING TIME OF SECOND MUSIC PIECE (MIMUTE, SECOND, FRAME) | 15, 04, 00 |
| INDEX (MIMUTE, SECOND, FRAME) 01 | 15, 04, 00 |
| 02 | 22, 00, 00 |
| STARTING TIME OF THIRD MUSIC PIECE (MIMUTE, SECOND, FRAME) | 30, 06, 00 |
| INDEX (MIMUTE, SECOND, FRAME) 01 | 30, 06, 00 |

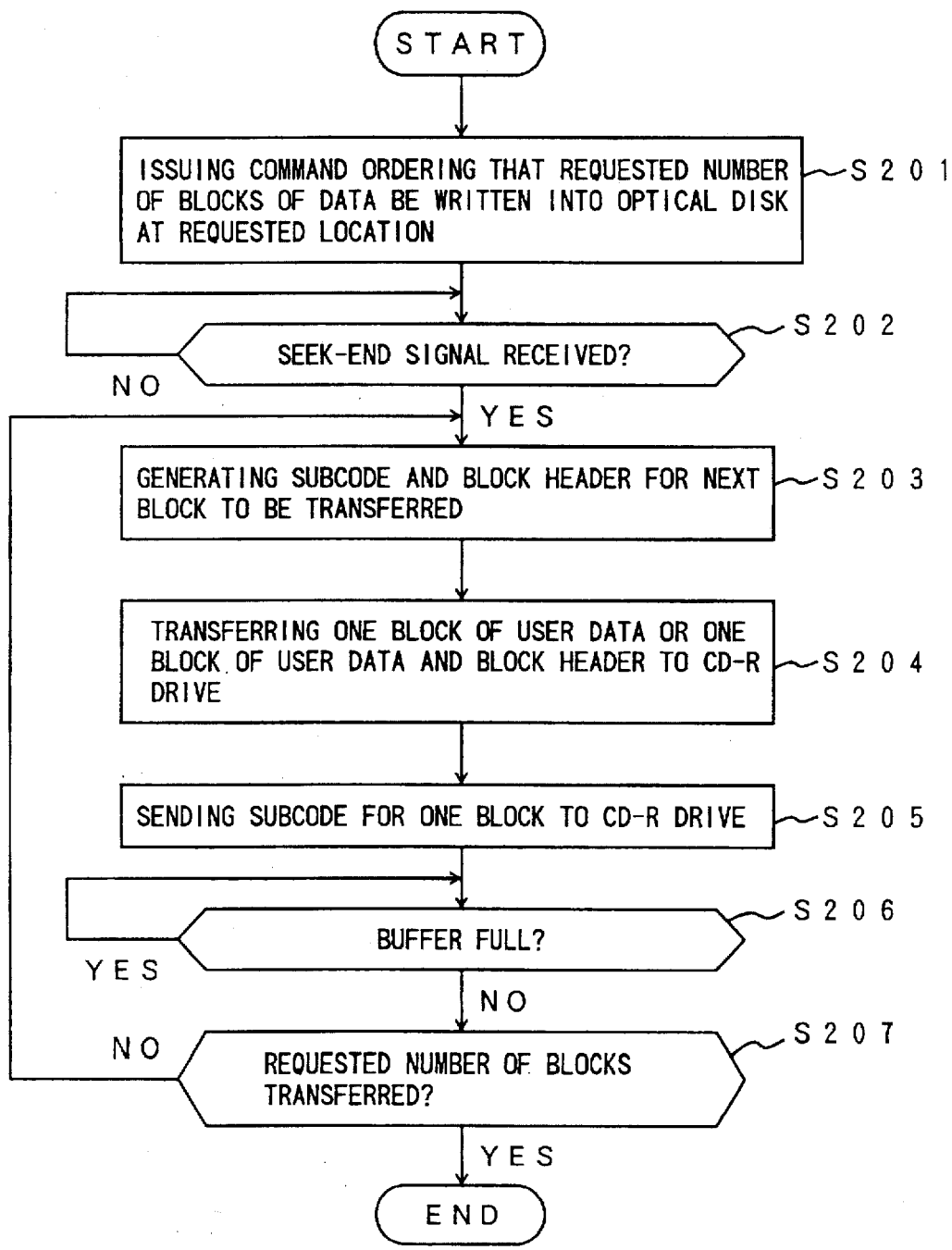

1

OPTICAL DISK RECORDING DEVICE AND OPTICAL DISK DRIVE

This application is a continuation of application Ser. No. 08/412,728, filed Mar. 29, 1995 now abandoned.

BACKGROUND OF THE INVENTION

1. Field of the Invention

The present invention generally relates to external storage devices, and particularly relates to an external storage device which is connected to a host computer and writes/reads data for an optical disk.

2. Description of the Prior Art

Keeping pace with a recent development of computers realizing a faster processing speed and a larger memory volume, external storage devices connected to these computers also have been subject to increases in the amount of their storage capacities. Among such, devices using an optical disk for reading/writing information are heeded as an external storage device of a significant amount of storage capacity. Hereinafter, the devices using an optical disk are called a CD-R device.

FIG. 1 shows a block diagram of a CD-R disk writing device 11 of the prior art. The CD-R disk writing device 11 includes a CD-R drive 12 and a host computer 20 which are connected with each other through a bus 19. The CD-R drive 12 carries out recording/reproducing processing for an optical disk, according to commands given by the host computer 20.

The CD-R drive 12 includes a recording/reproducing unit 13, a buffer 14, a special-purpose HDD (hard disk drive) 15, an I/F (interface) 16, and signal lines 17 and 18.

A structure and functions of the recording/reproducing unit 13 of the CD-R drive 12 will be described later in detail.

The I/F 16 is a circuit for handling interface with the host computer 20. The special-purpose HDD 15 is used for temporarily storing data provided from the host computer 20. The buffer 14 has a predetermined amount of data capacity, and temporarily stores data provided from the special-purpose HDD 15.

The I/F 16, the special-purpose HDD 15, and the buffer 14 are connected through the signal lines 17, which are comprised of a data bus and control lines. The recording/reproducing unit 13 and the I/F 16 are connected through the signal lines 18, which are comprised of another data bus and control lines. The signal lines 18 are used for conveying commands given by the host computer 20.

The host computer 20 includes a HDD 21, a display 22, a CPU (central processing unit) block 23, an I/F 24 for handling interface with the CD-R drive 12, and an input device 25 such as a keyboard and the like.

The CPU block 23 has a CPU, ROM, and RAM, and, also, is provided with an interface circuit for the input device 25. The CPU block 23 and the I/F 24 are connected with each other through signal lines 26, which are comprised of a data bus and control lines.

The I/F 24 is connected with the I/F 16 of the CD-R drive 12 through signal lines 19, which are comprised of a data bus and control lines. Here, such a standard as SCSI (small computer system interface) may be used for the I/F 16 and the I/F 24.

A personal computer commonly used can serve as the host computer 20.

FIG. 2 shows another block diagram of the CD-R disk writing device 11 of FIG. 1 with a block diagram of the recording/reproducing unit 13.

2

With reference to FIG. 2, a data-recording operation of the CD-R drive 12 will be described below.

The recording/reproducing unit 13 includes an optical disk 31, a spindle motor 32 for rotating the optical disk 31, and a pick-up 33 for recording/reproducing information by illuminating a laser beam on to a desired track of the optical disk 31. The recording/reproducing unit 13 further includes a pick-up shifting mechanism 34 for moving the pick-up 33 in a radial direction of the optical disk 31, and a head-amplifier 35 for converting signals reproduced by the pick-up 34 into signals of a predetermined level.

The recording/reproducing unit 13 further includes a servo circuit 36, an encoder 37, and a CPU 38. The servo circuit 36 generates a wobble servo signal for controlling the spindle motor 32, and controls a position of the pick-up 33. The encoder 37 modulates user data from the buffer 14 and subcode data and block header data from the CPU 38 by using an EFM (eight-to-fourteen modulation) in accordance with predetermined standards, and, then, supplies modulated data to the pick-up 33. The CPU 38 has ROM and RAM, and is connected with the I/F 16 through the signal lines 18.

Guiding grooves which can be optically detected are formed on a surface of the optical disk 31 along a track, and wobbling signals are recorded as a variation in a width of the guiding grooves.

The servo circuit 36 generates tracking signals and focusing signals based on the reproduced signals provided by the pick-up 33 through the head-amplifier 35, and provides these signals for the pick-up 33. Also, the servo circuit 36 generates the wobble servo signals, and provides it for the spindle motor 32. By using these signals, the pick-up 33 can follow a track on the optical disk 31, and the spindle motor 32 can rotate the optical disk 31 such that a linear velocity of the optical disk 31 with regard to the pick-up 33 is kept constant. Here, a single track of a spiral shape is formed from an inner side to an outer side of the optical disk 31, and data is recorded on this track with a constant linear recording density.

When writing data, the CPU block 23 of the host computer 20 reads data from the HDD 21, and sends it to the CD-R drive 12. The CD-R drive 12 receives the data at the I/F 16, and stores it into the special-purpose HDD 15. Then, the data stored in the special-purpose HDD 15 is supplied to the buffer 14 according to an available storage volume of the buffer 14.

The reason why the special-purpose HDD is provided is because a data-transfer speed between the host computer 20 and the CD-R drive 12 differs from a data-recording speed of the recording/reproducing unit 13. Namely, the special-purpose HDD 15 serves as a buffer for matching a data-processing speed of the CD-R drive 12 with the data-transfer speed of the host computer 20. Unfortunately, a HDD device is a relatively bulky device comprised of disks, actuators, etc., contained in a sealed housing.

Accordingly, in the CD-R disk writing device 11 of the prior art, the necessity to provide the special-purpose HDD 15 inside the CD-R drive 12 leads to a problem that the CD-R drive 12 tends to become large and costly.

Also, maintenance of the special-purpose HDD 15 is necessary at the time of maintenance of the CD-R drive 12. Thus, at a time of maintenance before the CD-R disk writing devices are shipped out from a factory, the maintenance should be taken care of on the manufacture's side. When maintenance should be conducted by users, these users should take care of the special-purpose HDD inside the CD-R drive as well as the HDD inside the host computer, leading to a too much trouble.

In addition to the above-identified problems of the CD-R disk writing device of the prior art, another problem arises from a way of data processing in the CD-R disk writing device.

In order to clarify this problem, a recording format of the disk 31 will be described below with reference to the accompanying drawings.

FIGS. 3A through 3C show a structure of subcode frame. In the optical disk 31, data is recorded by a unit of 2352 bytes, which constitute a one block. This one block is called a subcode frame, which is in turn comprised of 98 frames. One frame includes 24 bytes of data.

When data of one frame is recorded, 1 byte of subcode data and 8 byte of parity are attached to the 24 bytes of data, and 33 bytes thus obtained are modulated by the EFM. Further, a frame synchronizing signal is added to the modulated data, thus providing one frame of 588 bits.

In the case of CD-DA (CD for music), one sampling data is 4 bytes comprised of a 2-byte L (left) signal and a 2 byte R (right) signal of an audio signal. A sampling frequency for the audio signal is 44.1 kHz, and one frame is 24 bytes as described above. Thus, a frequency of the frames is 44.1/(24/4)=7.35 kHz. This means that a period of one frame is 1/7350 second.

The subcode is data used for, for example, searching a start point of music pieces, and is comprised of 8 channels of P through W. Each bit of P through W channels is recorded in a subcode area which is an 8-bit area following the frame synchronizing signal. As shown in FIG. 3B, each of P through W channels is completed as one complete data set in 98 frames. That is, the subcode frame which is comprised of 98 frames includes one complete subcode.

First two bytes S0 and S1 of the subcode are a synchronizing signal for the subcode. The P channel of the subcode indicates a pausing period located at the start of a music piece. The pausing period is indicated by "1" of the P channel, and "0" indicates otherwise.

FIG. 3C shows a frame structure of the Q channel of the subcode. A control signal located at 4-bit area following a S1 bit is used fop indicating the number of transfer channels, whether there is an emphasis or not, and whether data is digital or not. An address signal following the control signal is usually a predetermined fixed value "0001".

A music-piece number following the address signal indicates an ordinal number of the music piece in a series of music pieces stored in the optical disk. An index indicates a portion within the music piece. An absolute time indicate a total time length lapsed from a start of data area of the optical disk 31. As described above, one subcode frame is comprised of 98 frames, and, thus, has a length of 1/75 second (98/7350 second). A frame number in the absolute time takes values ranging from 0 to 74, increasing from 0 to 74 to return to 0 again. Thus, the frame number indicates fractions of one seconds by step increases of 1/75 second.

A relative time indicates a time length lapsed from a start of the music piece. As same as the absolute time, the relative time is comprises of the minute, the second, and a frame number. The relative time is decreased during the pausing period from 2 seconds to 0 second.

At the end of the Q channel is attached 16 bits of error detection codes CRCC (cyclic redundancy check code).

FIG. 4 shows an example in which three music pieces are recorded on the optical disk 31. The absolute time monotonously increases from the start of the data area (end of a read-in period) to the end of a read-out period. The relative time decreases from 2 seconds to 0 second during the pausing period of each music piece, and increases from the start of the music piece toward the end.

TOG (table of content) is recorded in a read-in period as information for a search. The TOG records a start time of each music piece, the music-piece number of the first music piece, the music-piece number of the last music piece, and a start time of the read-out period.

FIGS. 5A and 5B show an illustrative drawing for explaining a signal format of a CD-ROM. As described above, 2352 bytes of data are recorded in one subcode frame (98 frames). As shown in FIG. 5A, 294 samples of an audio signal, each of which is comprised of a 2-byte L signal and a 2-byte R signal, are recorded in one subcode frame.

As shown in FIG. 5B, 2352-byte data within one subcode frame is treated as one block in the CD-ROM. In a mode 1 of the CD-ROM, one block is comprised of 12 bytes of a synchronizing signal, 4 bytes of a header, 2048 bytes of user data, and 288 bytes of error correction codes ECC. Hereinafter, the synchronizing signal, the header, and the error correction codes ECC are collectively called a block header.

The header includes a block address comprised of the minute, the second, and the block, and, also, includes a mode signal. The block address is identical to the absolute address provided in the Q channel of the subcode.

With reference to the data formats described above, a data-writing operation of the CD-R disk writing device 11 of the prior art will be described below.

The CPU block 23 of the host computer 20 creates a Q sheet indicating an arrangement in which data is to be written into the optical disk 31. The creation of the Q sheet is done prior to the writing of the data, and held by the CPU block 23.

FIG. 6 shows an example of the Q sheet in the case that there are three music pieces to be written into the optical disk 31. As shown in FIG. 6, the Q sheet includes a start time of each music piece, a music-piece number of the first music piece, a music-piece number of the last music piece, a start time of the read-out period, and a start time of the indexes of each music piece. Although not shown in the figure, the control signal and the address signal in the Q channel on the subcode are also recorded in the Q sheet. Here, if data of a different format is to be recorded on the optical disk 31, the Q sheet also includes a time at which the control signal is switched.

The Q sheet is transferred from the CPU block 23 of the host computer 20 to the CPU 38 of the CD-R drive 12 via the I/F 24 and the I/F 16. The CPU 38 retains the Q sheet thus provided.

After the Q sheet is transferred, the CPU block 23 of the host computer 20 issues a command to the CD-R drive 12, requesting that a requested number of blocks of data be written into the optical disk 31 at a requested location. This command is supplied to the CPU 38 of the CD-R drive 12 via the I/Fs 24 and 16.

Upon receiving the command for writing data, the CPU 38 directs the servo circuit 36 to control the pick-up 33 to be moved to the requested location. The wobbling signal recorded in advance on the optical disk 31 includes ATIP data which is time information indicating positions on the optical disk 31. The servo circuit 36 can control the pick-up 33 to be moved to the requested location based on the ATIP data.

The ATIP data is also supplied to the CPU 38 via the servo circuit 36. Based on the ATIP data, the CPU 38 can get information about the absolute time indicating a location of a frame which the pick-up 33 is currently tracing. The CPU 38 provides the encoder 37 with a synchronizing signal extracted from the ATIP data.

Just prior to completion of the seek operation, the CPU 38 sends a seek-end signal to the host computer 20 via the I/F 16.

Upon receiving the seek-end signal, the CPU block 23 of the host computer 20 reads user data from the HDD 21, and sends it to the CD-R drive 12 via the I/F 24. The user data transferred to the CD-R drive 12 is stored into the buffer 14.

When the user data is transferred, an amount of data commensurate to an available storage space within the buffer 14 is transferred by a unit of a block.

Upon the completion of the seek operation, the CPU 38 of the CD-R drive 12 gives an instruction to the encoder 37 to start writing the user data.

The encoder 37, in response to this instruction, modulates the user data read from the buffer 14, and, also, modulates subcode data and a block header provided from the CPU 38. Modulated data thus generated is provided for the pick-up 33 to be written into the track on the optical disk 31.

Here, an operation of the CPU 38 and the operation of the encoder 37 are as follows. The CPU 38 is holding the subcode and the block header (for CD-ROM only) for a block to be written, which are created based on the Q sheet. By using the ATIP data from the servo circuit 36, the CPU 38 supplies 8 bits of the subcode data to the encoder 37 when the pick-up 33 comes to a point in a frame where the subcode data should be written. Also, by using the ATIP data from the servo circuit 36, the CPU 38 supplies the block header to the encoder 37 when the pick-up 33 comes to a point in a frame where the block header should be written.

In short, the CPU 38 generates the subcode data and the block header for each block, and provides them for the encoder 37 at the right timing.

When the subcode data or the block header is supplied by the CPU 34, the encoder 37 modulates the subcode data or the block header whichever supplied to generate the modulated data. This modulated data is then supplied to the pick-up 33. When neither the subcode data or the block header is supplied, the encoder 37 modulates the user data read from the buffer 14 to generate the modulated data. This modulated data is then supplied to the pick-up 33.

In this manner, the requested number of blocks of data are written into the optical disk 31 at the requested position.

As described above, in the CD-R disk writing device 11 of the prior art, the CPU 38 of the CD-R drive 12 generates the subcode data and the block header in realtime, and supplies them to the encoder 37. In order to perform this processing, the CPU 38 needs to carry out complex processes. As a result, the memory volume of the ROM and the RAM required for the operation of the CPU 38 becomes large. This creates a problem that a cost of the CD-R drive 12 becomes high.

Also, when the disk-format of the optical disk 31 (e.g., CD-DA, CD-ROM mode 1, CD-ROM mode 2, etc.) is changed, the processing of the CPU 38 with regard to the generation and supply of the subcode data and the block header should also be changed. Thus, a change in the disk format requires a change in contents of the ROM of the CPU 38. This means that there should be changes in specifications of the CD-R drive 12.

Accordingly, there is a need in the field of CD-R disk writing devices for a CD-R disk writing device which is miniaturized and requires simpler maintenance by disposing of the special-purpose HDD installed inside the device.

Also, there is a need in the field of CD-R disk writing devices for a CD-R disk writing device which can reduce the process load on the CD-R drive, can lower the cost, and can be applicable to various disk formats without changing the specifications of the device.

SUMMARY OF THE INVENTION

Accordingly, it is a general object of the present invention to provide a CD-R disk writing device which can satisfy the need described above.

It is another and more specific object of the present invention to provide a CD-R disk writing device which is miniaturized and requires simpler maintenance by disposing of the special-purpose HDD installed inside the device.

In order to achieve the above objects, an optical disk writing device according to the present invention includes an optical disk drive recording data into an optical disk and having no harddisk as a data buffer, and a host computer controlling the optical disk drive and transferring the data to the optical disk drive by using a data storage connected to the host computer as a data buffer for the transferring and the recording.

In the above-described optical disk writing device, an internal or external storage device provided for the host computer can be used as a data buffer for data-write processing, so that a data buffer such as the special-purpose HDD is no longer necessary. Thus, the optical disk writing device can be miniaturized and made less costly.

Also, in order to achieve the above objects, an optical disk writing device includes an optical disk drive recording data into an optical disk by a unit of a logical block and capable of changing a length of the logical block stored in one sector of the optical disk so as to change a recording rate of the data, and a host computer transferring the data to the optical disk drive at a predetermined rate, which host computer determines the length of the logical block based on the predetermined rate and informs the optical disk drive of the length, wherein the optical disk drive records the data by using the length of the logical block so that the recording rate is no faster than the predetermined rate.

In the above-described optical disk writing device, the data-recording speed of the optical disk drive can be adjusted by setting the logical block length per sector of an optical disk in accordance with the data-transfer speed of the host computer. Thus, the recording speed of the optical disk drive can be matched with the data transfer speed of the host computer, so that the data buffer such as special-purpose HDD required in the prior art optical disk drive becomes no longer necessary.

It is yet another object of the present invention to provide a CD-R disk writing device which can reduce the process load on the CD-R drive, can lower the cost, and can be applicable to various disk formats without changing the specifications of the device.

In order to achieve the above object, an optical disk writing device includes an optical disk drive recording data into an optical disk, wherein the data should include auxiliary data when the data is recorded, and a host computer generating the auxiliary data and transferring the data including the auxiliary data to the optical disk drive so that the data transferred to the optical disk drive is ready to be recorded.

In the above-described optical disk writing device, the host computer connected to the optical disk drive generates the auxiliary data, and sends data comprised of the user data and the auxiliary data to the optical disk drive in an order in which the data is written into the optical disk. Thus, the optical disk drive does not have to carry out complex processes for generating the auxiliary data at a right timing in realtime. This leads to the optical disk drive having a smaller control unit and, thus, to the optical disk drive being less costly.

Also, the optical disk drive receives and modulates the data which is generated by the host computer in accordance with a disk format of the optical disk. Thus, various disk formats can be appropriately handled without changing the specifications of the optical disk drive.

Other objects and further features of the present invention will be apparent from the following detailed description when read in conjunction with the accompanying drawings.

BRIEF DESCRIPTION OF THE DRAWINGS

FIG. 6 is a chart showing an example of a Q sheet in the case that there are three music pieces to be written;

FIG. 15 is a flowchart of a process of transferring data from a host computer to a CD-R drive of FIG. 14.

DESCRIPTION OF THE PREFERRED EMBODIMENTS

In the following, principles and embodiments of the present invention will be described with reference to the accompanying drawings.

Figure 1:
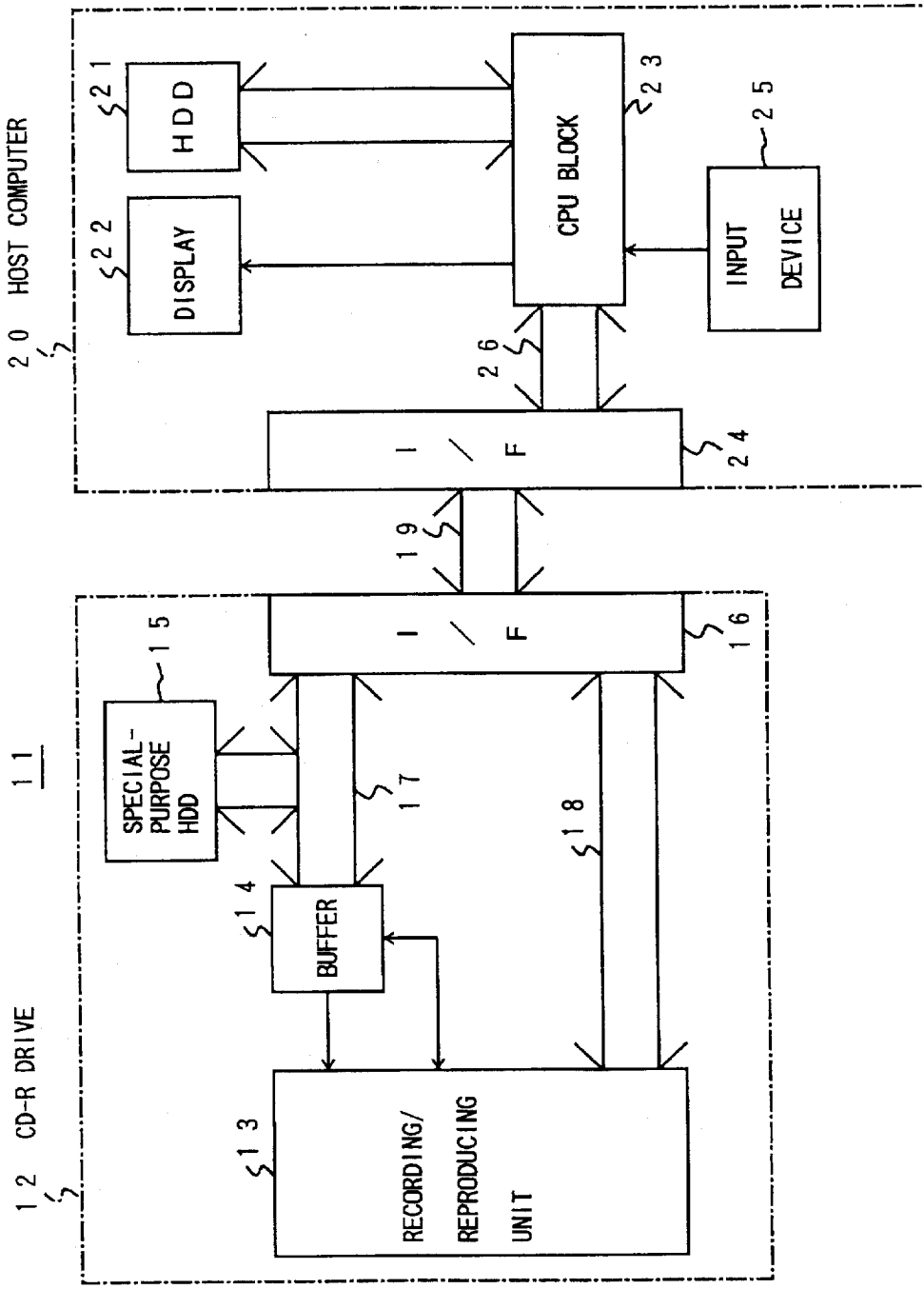
FIG. 1 is a block diagram of a CD-R disk writing device of the prior art.
Figure 2:
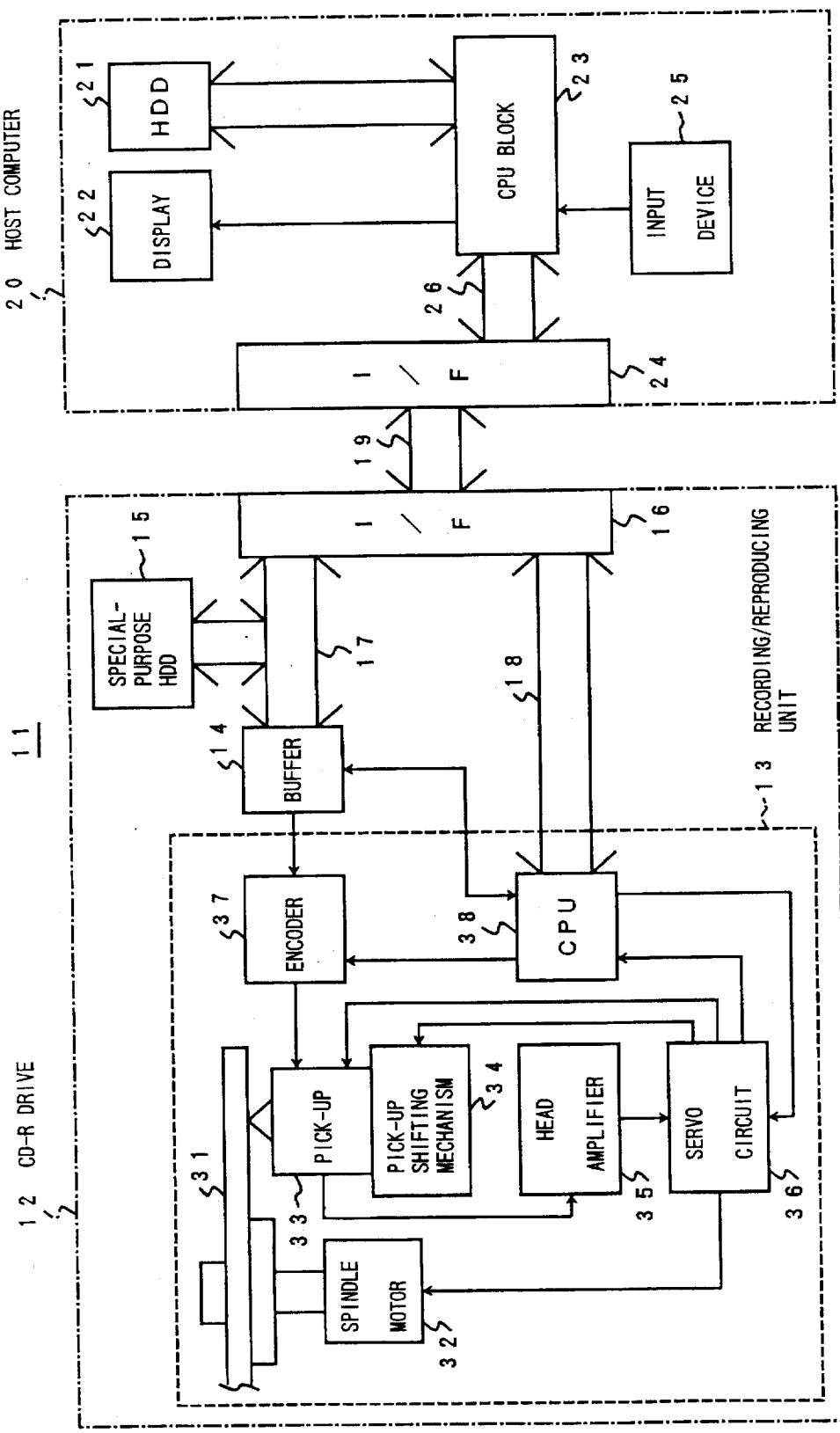
FIG. 2 is a block diagram of the CD-R disk writing device of FIG. 1, in which a recording/reproducing unit is shown in detail.
Figure 7:
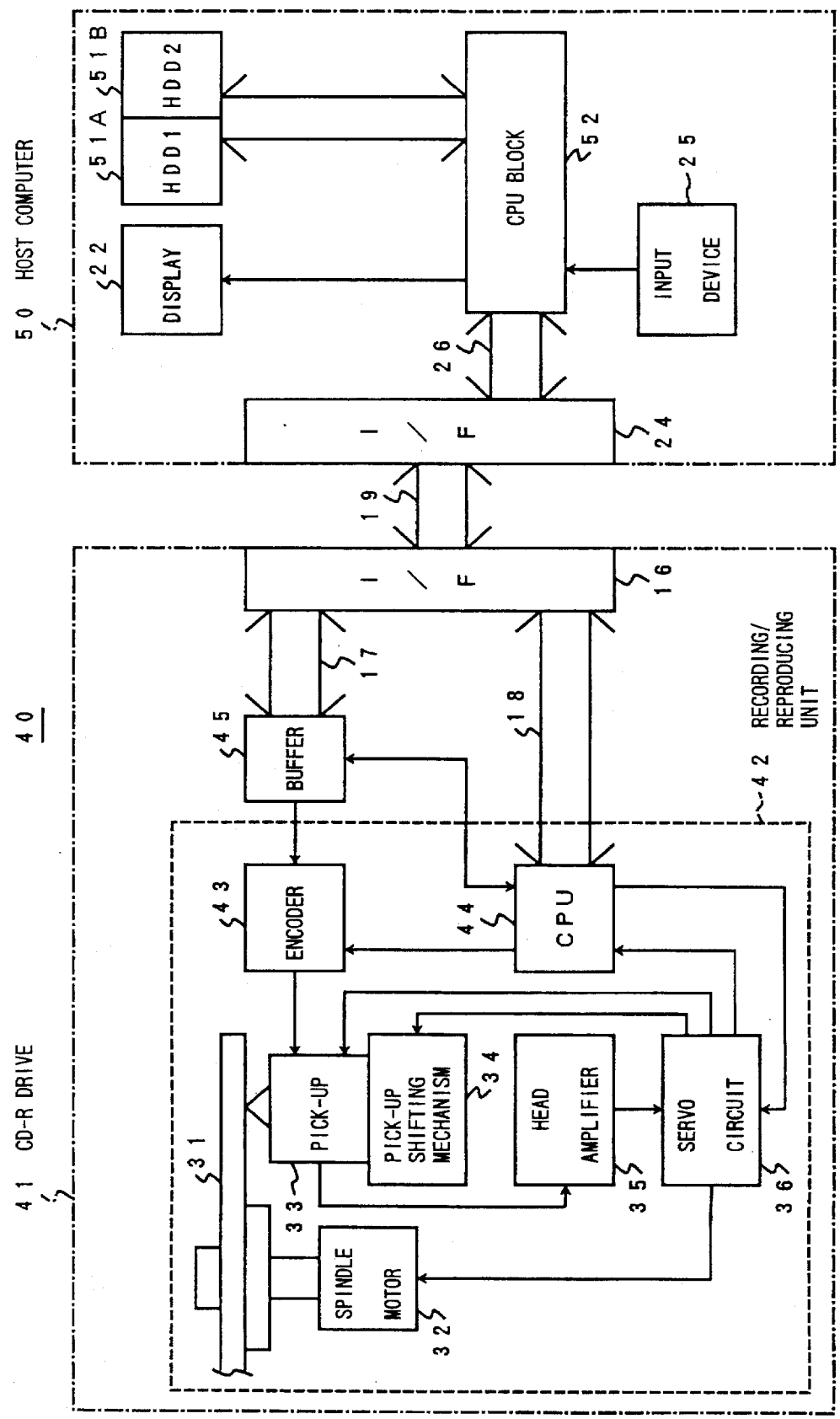
FIG. 7 is a block diagram of a CD-R disk writing device of a first embodiment according to a first principle of the present invention.

FIG. 7 shows a block diagram of a first embodiment according to a first principle of the present invention. In FIG. 7, the elements same as those of FIG. 2 are referred by the same numerals, and a description thereof will be omitted. The first principle includes using an internal or external storage device provided for a host computer as a data buffer in the processing of data writing. Thus, a CD-R drive does not need to have a data buffer such as the special-purpose HDD, resulting in the miniaturization of the CD-R drive.

FIG. 7 shows a CD-R disk writing device 40 which includes a CD-R drive 41 and a host computer 50 connected via the signal lines 19. The CD-R drive 41 includes the optical disk 31 so as to be able to write and read a large amount of information.

The CD-R drive 41 includes a recording/reproducing unit 42 and a buffer 45. The recording/reproducing unit 42 includes an encoder 43 and a CPU 44. The CD-R drive 41 carries out processing of data recording and data reproducing for the optical disk 31 based on control signals given by the host computer 50. The buffer 45 temporarily stores data provided from the host computer 50 via the interface 16.

The host computer 50 includes a HDD1 51A, a HDD2 51B, and a CPU block 52.

The CPU block 52 has a CPU, ROM, RAM, various buffers, and driving circuits implemented on a circuit board, and carries out various control processing and operations. The control processing by the CPU block 52 based on its software is a basis for the processing of data writing and data read-ing for the CD-R drive 41. The driving circuits mentioned above includes driving circuits for the HDD1 51A, the HDD2 51B, and the display 22.

The HDD1 51A and the HDD2 51B are an internal or an external device of the host computer 50, and their operations are managed by the CPU block 52 based on DOS (Disk Operation System). In the first embodiment, the HDD1 51A and the HDD2 51B are separate disk spaces defined in a single harddisk drive with the HDD1 51A serving as a DOS area and the HDD2 51B serving as a CD-R specific area. The separate disk spaces can be defined by either physical addresses or logical address.

The display 22 is used as an output device, and displays information based on the control processing by the CPU block 52. The output device is not limited to the display 22, and can be any output device such as a printer.

The CD-R drive 41 and the host computer 50 exchange data with each other via the signal lines 19 connecting between the I/F 16 and the I/F 24.

It should be noted that the CD-R drive 41 does not include a special-purpose HDD, which is different form a structure of the CD-R drive 12 of FIG. 2. The absence of the special-purpose HDD, which is relatively bulky, can realize the miniaturization of the CD-R drive 41.

Also, the maintenance of the harddisks in the CD-R disk writing device 40 can be concentrated on the host computer 50, so that the maintenance can be simpler than in the prior art.

As noted above, the host computer 50 is characterized in that the HDD1 51A and the HDD 51B are provided as separate disk spaces. This configuration is necessitated by the absence of the special-purpose HDD in the CD-R drive 40.

Figure 8:
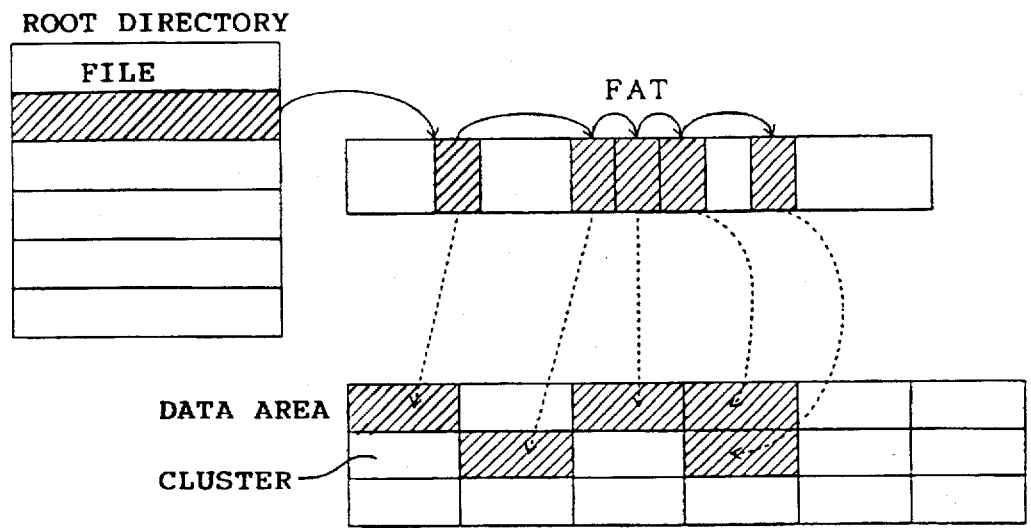
FIG. 8 is an illustrative drawing showing an example of how to access a file in a DOS file structure.
Figure 9:
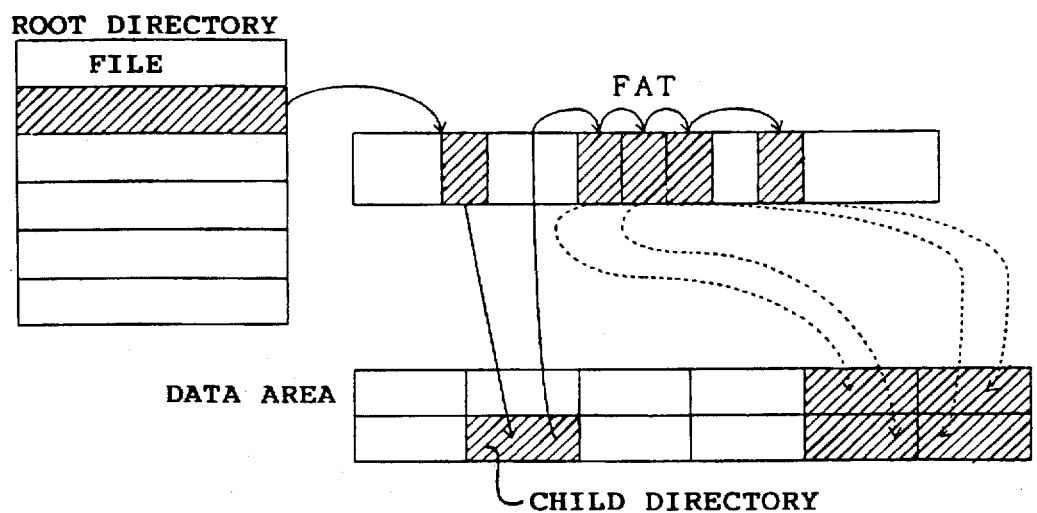
FIG. 9 is an illustrative drawing showing an example of how to access a file in a directory tree in a DOS file structure.

A harddisk inside a harddisk drive generally has a plurality of circular tracks formed on its surfaces, each of which tracks are divided into sectors. As shown in FIG. 8, data recorded on the disk is managed based on directory files containing file information. Information on locations of sectors in which a given file is recorded is stored in a FAT (file allocation table), and sectors are grouped into clusters. When a file is to be recorded or retrieved, a root directory is looked up to access a relevant FAT information, and, then, this information is used for accessing relevant clusters.

In the case that a file structure poses more than one hierarchy of directories, a given disk is accessed as follows. First, the root directory is looked up first. Next, a relevant FAT information is looked up. Then, a target directory is accessed to get information regarding a target file. Then, a relevant FAT information regarding the target file is obtained. Finally, clusters recording the target file is accessed. In this set of operations, an access arm which moves a magnetic head to a desired position on the disk should be moved more frequently than in the case of a single-hierarchy file structure.

Unfortunately, the DOS employs sequential-file data accessing which access one sector after another in a series from the start of the file to the end. Thus, a file-recording/retrieving speed becomes slow when a file is contained in non-consecutive sectors scattered throughout on the disk. (A file is recorded in consecutive sectors when it is recorded first time on the disk, but tends to be recorded in scattered non-consecutive sectors after several rewrite of the file.)

Assume that there is no HDD2 51B in the host computer 50 of FIG. 7. When a file-recording/retrieving speed is slow as described above, a speed at which data read from the HDD1 51A is transferred to the CD-R drive 41 is slower than a speed of recording data on the optical disk 31. In order to match these two speeds, the CD-R drive 12 of FIG. 2 has the special-purpose HDD 15 in the prior art. The special-purpose HDD 15 can record and reproduce information at a high speed by employing a file-management method different from that of the DOS file management. However, as described earlier, this configuration results in the above-identified problems, i.e., a size increase and a cost increase In order to obviate these problems, according to the first principle of the present invention, the special-purpose HDD is provided in the host computer 50 as the HDD2 51B, as shown in FIG. 7.

As noted above, the HDD1 51A and the HDD2 51B are the separate disk areas defined by physical addresses or logical addresses. As an example of division based on physical addresses, a set of harddisks in a harddisk drive can be divided into two, so that some harddisks are used as DOS areas and others are used as CD-R areas. Division based on logical address can be implemented by programs. Whichever divisions are employed, they can be realized relatively easily.

In the first embodiment, the HDD1 51A and the HDD2 51B are logically defined areas.

A memory volume of harddisks are quite large due to a recent development of the technology, so that the division of the harddisk as described above does not lead to any problem of lack of memory volume.

Thus, the first principle of the present invention can realize the miniaturization of the CD-R drive 41.

In the following, data-write/read processes of the CD-R disk writing device 40 will be described.

With reference to FIG. 7, when data is written into the CD-R drive 41, data to be stored are transferred from the HDD1 51A to the HDD2 51B based on an instruction given by the CPU block 52. Namely, the HDD2 51B serves as a data buffer at a time of data writing. Then, the data is transferred from the HDD2 51B to the buffer 45 of the CD-R drive 41 via the I/F 24, the signal lines 19, and the I/F 16. The buffer 45 temporarily stores the data, and sends it to the recording/reproducing unit 42. The recording/reproducing unit 42 writes the data on to the optical disk 31.

When data is read from the CD-R drive 41, the recording/reproducing unit 42 of the CD-R drive 41 is operated based on an instruction from the CPU block 52 of the host computer 50 so as to read data from the optical disk 31. The data is then sent to the CPU block 52 via the buffer 45, the I/F 16, the signal lines 19, and the I/F 24. The data sent to the CPU block 52 may be displayed on the display 22 after predetermined processing, or may be stored into the HDD1 51A.

Figure 10:
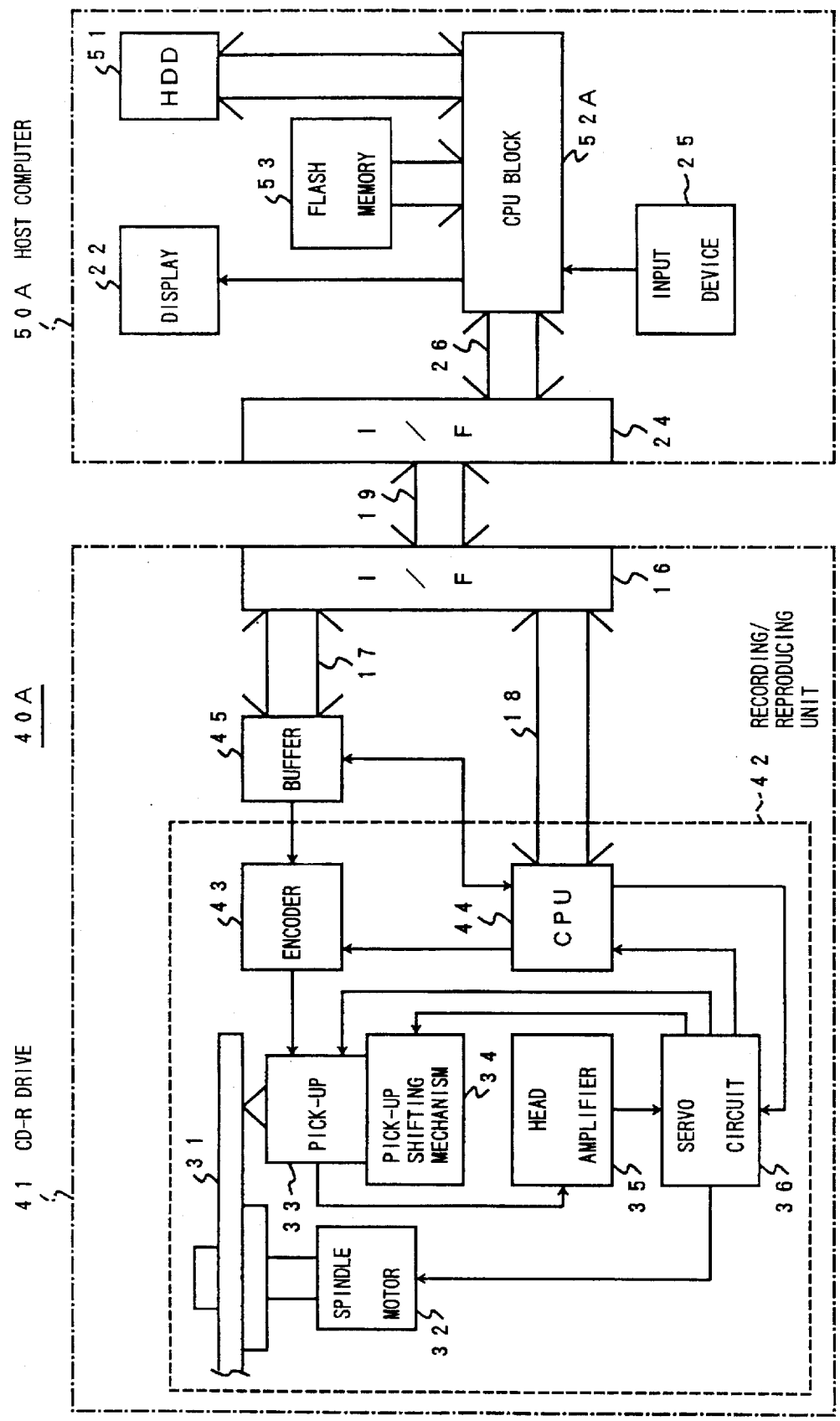
FIG. 10 is a block diagram of a CD-R disk writing device of a second embodiment according to the first principle of the present invention.

FIG. 10 shows a block diagram of the CD-R disk writing device 40A according to a second embodiment of the first principle. In FIG. 10, the same elements as those of FIG. 7 are referred by the same numerals, and a description thereof will be omitted.

The CD-R disk writing device 40A includes the CD-R drive 41 and the host computer 50A. The host computer 50A differs from the host computer 50 of FIG. 7 only in a HDD 51 and a flash memory 53. Namely, the HDD 51 is provided as a conventional HDD, instead of the HDD1 51A and the HDD2 51B. The function as a data buffer is carried out by the flash memory 53. Here, both of the HDD 51 and the flash memory 53 are controlled under the DOS file management.

The flash memory 53 does not include a mechanical part inside, which is different from a harddisk drive. Thus, even under the DOS management, the flash memory 53 can carry out data-write/read processing at a high speed. Also, the flash memory 53 can store a large amount of information in a small amount of area, thus contributing to the miniaturization of the host computer 50A.

In the following, data-write/read processes of the CD-R disk writing device 40A will be described.

With reference to FIG. 10, when data is written into the CD-R drive 41, data to be stored are transferred from the HDD 51 to the flash memory 53 based on an instruction given by the CPU block 52. Namely, the flash memory 53 serves as a data buffer at a time of data writing. Then, the data is transferred from the flash memory 53 to the buffer 45 of the CD-R drive 41 via the I/F 24, the signal lines 19, and the I/F 16. The buffer 45 temporarily stores the data, and sends it to the recording/reproducing unit 42. The recording/reproducing unit 42 writes the data on to the optical disk 31.

When data is read from the CD-R drive 41, the recording/reproducing unit 42 of the CD-R drive 41 is operated based on an instruction from the CPU block 52 of the host computer 50 so as to read data from the optical disk 31. The data is then sent to the CPU block 52 via the buffer 45, the I/F 16, the signal lines 19, and the I/F 24. The data sent to the CPU block 52 may be displayed on the display 22 after predetermined processing, or may be stored into the HDD1 51A.

As described above, according to the first principle of the present invention, an internal or external storage device provided for the host computer can be used as a data buffer for the data-write processing, so that a data buffer such as the special-purpose HDD is no longer necessary in the CD-R drive. Thus, the CD-R drive can be miniaturized and made less costly.

Also, according to the first principle of the present invention, the maintenance of harddisks for the CD-R disk writing device can be solely directed to the host computer's side, so that the maintenance can become simpler.

Figure 11:
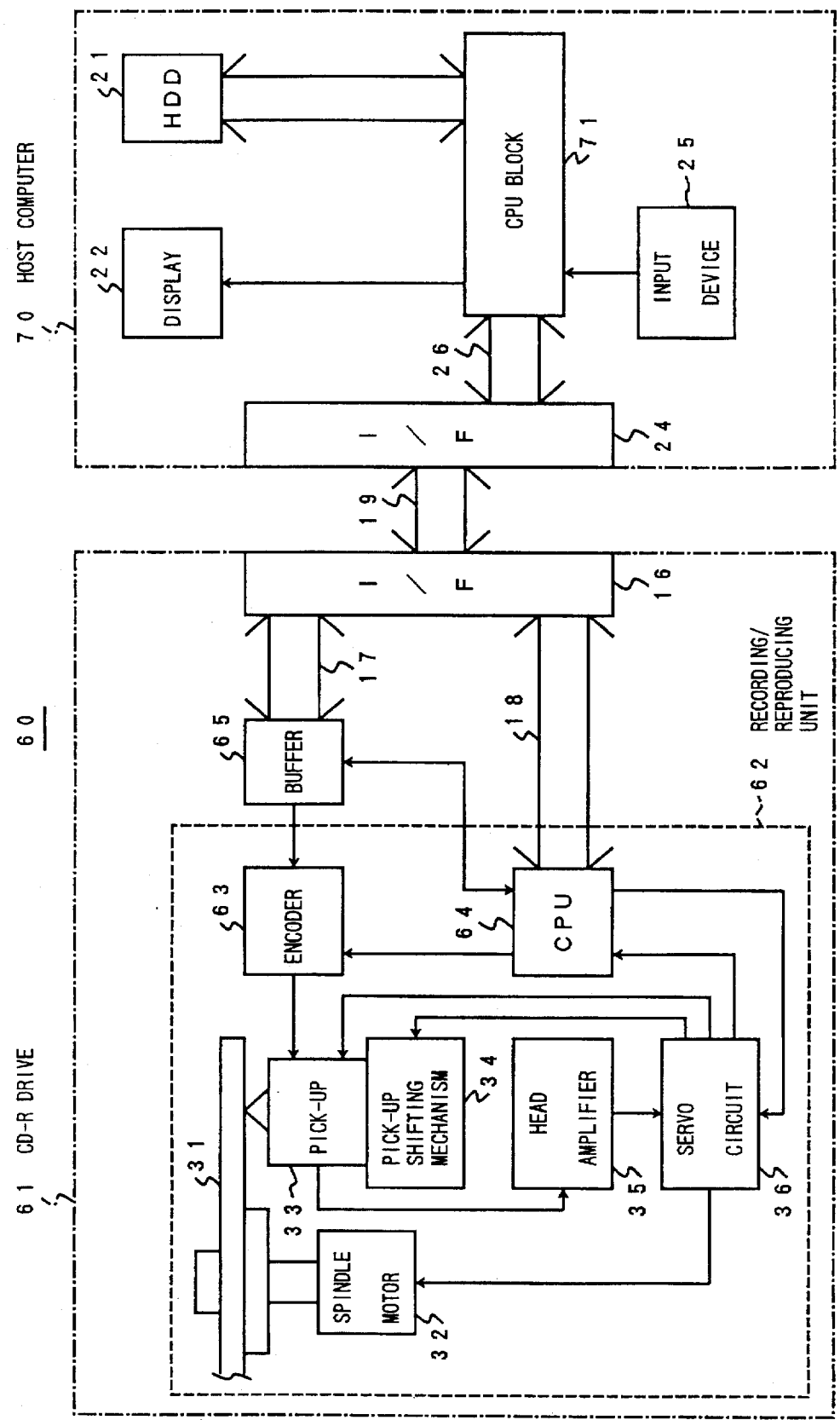
FIG. 11 is a block diagram of a CD-R disk writing device of an embodiment according to a second principle of the present invention.

FIG. 11 shows a block diagram of an embodiment of a second principle of the present invention. In FIG. 11, the elements same as those of FIG. 2 are referred by the same numerals, and a description thereof will be omitted.

The second principle includes adjusting a data-recording speed of a CD-R drive by setting a logical block length per sector of an optical disk in accordance with a data-transfer speed of the host computer. Thus, the recording speed of the CD-R drive can be matched with the data transfer speed of the host computer, so that the data buffer such as special-purpose HDD required in the prior art CD-R drive become no longer necessary.

FIG. 11 shows a CD-R disk writing device 60 which includes a CD-R drive 61 and a host computer 70 connected via the signal lines 19. The CD-R drive 61 includes a recording/reproducing unit 62 with the optical disk 31 therein so as to be able to write and read a large amount of information.

The recording/reproducing unit 62 includes the optical disk 31, the spindle motor 32 for rotating the optical disk 31, and the pick-up 33 for recording/reproducing information by illuminating a laser beam on to a desired track of the optical disk 31. The recording/reproducing unit 62 further includes the pick-up shifting mechanism 34 for moving the pick-up 33 in a radial direction of the optical disk 31, and the head-amplifier 35 for converting signals reproduced by the pick-up 34 into signals of a predetermined level.

The recording/reproducing unit 62 further includes the servo circuit 36, an encoder 63, and a CPU 64. The servo circuit 36 generates a wobble servo signal for controlling the spindle motor 32, and controls a position of the pick-up 33. The CPU 64 controls operations of the recording/reproducing unit 62.

The CD-R drive 61 further includes the I/F 16 and the buffer 65.

The buffer 65 has a predetermined amount of a data storage capacity, and temporarily stores data provided from the host computer 70. The buffer 65 may be of a FIFO memory. In the case of the FIFO memory, the encoder 63 reads data from the buffer 65 in an order in which the data from the I/F 16 is stored into the buffer 65. The encoder 63 modulates the data from the buffer 65 and subcode data and the like by using an EFM (eight-to-fourteen modulation) in accordance with predetermined standards, and, then, supplies modulated data to the pick-up 33.

The CPU 64 has ROM and RAM, and is connected with the I/F 16 through the signal lines 18 and with the buffer 65 through control lines.

Guiding grooves which can be optically detected are formed on a surface of the optical disk 31 along a track, and wobbling signals are recorded as a variation in a width of the guiding grooves.

The servo circuit 36 generates tracking signals and focusing signals based on the reproduced signals provided by the pick-up 33 through the head-amplifier 35, and provides these signals for the pick-up 33. Also, the servo circuit 36 generates the wobble servo signals, and provides it for the spindle motor 32. By using these signals, the pick-up 33 can follow the track on the optical disk 31, and the spindle motor 32 can rotate the optical disk 31 such that a linear velocity of the optical disk 31 with regard to the pick-up 33 is kept constant.

The host computer 70 includes the HDD 21, the display 22, a CPU (central processing unit) block 71, the I/F 24 for handling interface with the CD-R drive 61, and the input device 25 such as a keyboard and the like.

The CPU block 71 has CPU, ROM, and RAM, and, also, is provided with an interface circuit for the input device 25. The CPU block 71 and the I/F 24 are connected with each other through the signal lines 26, which are comprised of a data bus and control lines.

The I/F 24 is connected with the I/F 16 of the CD-R drive 61 through signal lines 19, which are comprised of a data bus and control lines. Here, such a standard as SCSI (small computer system interface) may be used for the I/F 16 and the I/F 24. A personal computer commonly used can serve as the host computer 70.

Figure 12:
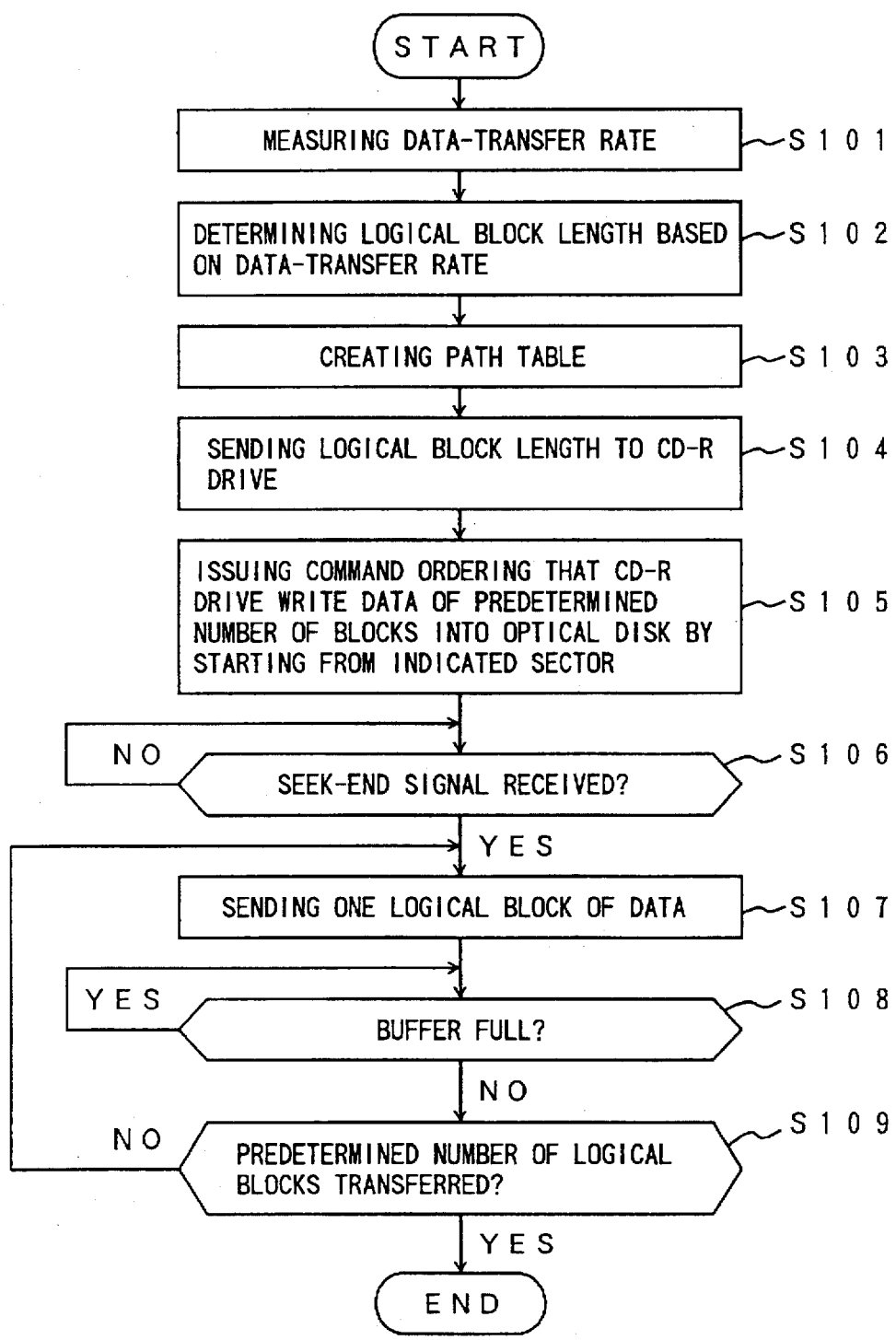
FIG. 12 is a flowchart of a process of determining a logical block length and transferring data to a CD-R drive of FIG. 11.

FIG. 12 shows a flowchart of a process of determining a logical block length and transferring data from the host computer 70 to the CD-R drive 61. The transfer of the data is carried out by the CPU block 71 based on software stored in the HDD 21.

The software is read from the HDD 21, and is stored into the RAM of the CPU block 71.

In FIG. 12, a step S101 is a step for measuring a data-transfer rate, a step S102 is a step for determining a logical block length, and a step S104 is a step for reporting the logical block length.

The HDD 21 stores user data which is to be written into the optical disk 31. For example, if the user data is data for a CD-ROM, the user data may be stored in the HDD 21 by dividing the user data into separate files.

2352 bytes of data within one subcode frame constitute a physical sector (hereinafter referred to as a sector). One sector includes a synchronizing signal, a sector address, a data area for recording the user data, error-correction codes, etc. In the case of the CD-R mode 1, a size of the data area is 2048 bytes. In the following, a description will be given for this case of the CD-R mode 1.

In FIG. 12, at the step S101, the CPU block 71 of the host computer 70 measures the data-transfer rate at which the data read from the HDD 21 is sent to the CD-R drive 61.

In order to measure the data-transfer rate, the CPU block 71 carries out DOS commands to write and read a predetermined amount of data for the HDD 21, and measures a time length which is necessary for these data writing and data read-ing. Based on this time length, the CPU block 71 determines the data-transfer rate at which data read from the HDD 21 is transferred to the CD-R drive 61.

At the step S102, the logical block length is determined based on the data-transfer rate obtained at the step S101. With regard to the determination of the logical block length, FIG. 13 shows a relation between a sector of the optical disk 31 and the logical block length.

Figure 13:
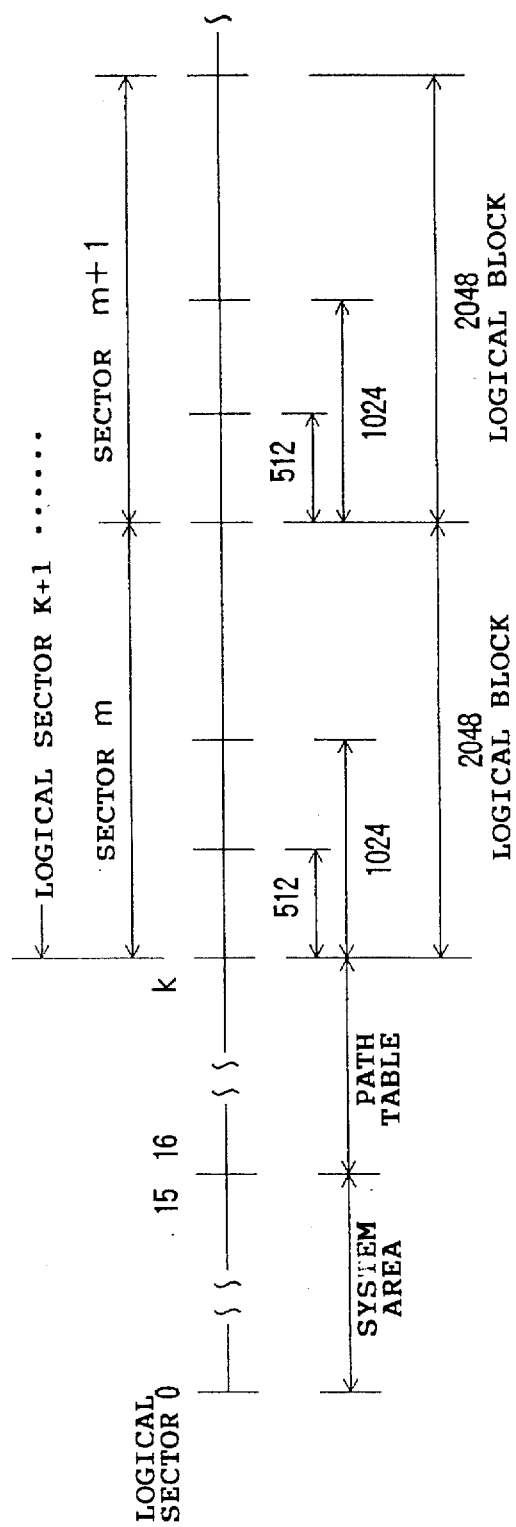
FIG. 13 is an illustrative drawing showing a relation between a sector of an optical disk and the logical block length.

With reference to FIG. 13, a data area within one sector of the optical disk 31 is comprised of 2048 bytes, which is a standard length for one logical block. The logical block length can be set to the standard length, half the standard length, or a quarter of the standard length, i.e., 2048 bytes, 1028 bytes, or 512 bytes. As will be described later, a logical block length of which the host computer 70 informs the CD-R drive 61 is used as a logical block length of the optical disk 31.

When the logical block length is shorter than 2048 bytes, a portion of the data area which remains vacant after data is written into a sector records "0" as an invalid value. The shorter the logical block length is, the smaller the amount of valid data within one sector. Since 2048-byte data is recorded into a sector on the optical disk 31 in synchronism with a synchronizing signal of a predetermined rate, a time length required for recording one sector is constant. Thus, as the logical block length becomes shorter, a rate at which valid data is recorded becomes lower, and, also, a data-transfer rate at which the host computer 70 sends the data to the CD-R drive 61 can be slower.

With reference back to FIG. 12, at the step S102, the logical block length is set to either one of 2048 bytes, 1024 bytes, or 512 bytes such that the recording rate of the CD-R drive 51 for the valid data is set to a range lower than the data-transfer rate obtained at the step S101.

Here, a configuration of a logical sector changes depending on the logical block length. When the logical block length is 2048 bytes, one logical sector is comprised of one sector. When the logical block length is 1024 bytes, one logical sector is comprised of two sectors. When the logical block length is 512 bytes, one logical sector is comprised of four sectors.

At a step S104, the CPU block 71 creates a path table to be sent to the CD-R drive 61, and stores it into a predetermined area of the HDD 21.

The path table is defined by the ISO 9660 standard for the CD-ROM format, and records a file-recording location within the optical disk 31, a size of the file, the logical block length, etc.

As shown in FIG. 13, the path table is recorded in an area starting from a logical sector 16. Logical sectors 0 through 15 are used as a system area. If the path table is recorded in logical sectors 16 through k, the user data is recorded in the following sectors starting from a sector k+1.

With reference to FIG. 12 again, at a step S104, the CPU block 71 sends the logical block length determined at the step S102 to the CPU 64 of the CD-R drive 61. The CPU 64 uses the logical block length as a logical block length for writing the data into the optical disk 31. Also, the CPU 64 informs the encoder 63 of the logical block length.

At steps from a step S105 to a step S109, the host computer 70 transfers the data to the CD-R drive 61.

At the step S105, the CPU block 71 of the host computer 70 issues a command ordering that the CD-R drive 61 write data of a predetermined number of logical blocks into the optical disk 31 by starting from an indicated sector. This data-writing command is supplied to the CPU 64 of the CD-R drive 61 via the I/F 24 and the I/F 16.

Upon receiving the data-writing command, the CPU 64 of the CD-R drive 61 controls the servo circuit 36 to move the pick-up 33 to a sector indicated by the data-writing command.

Just prior to completion of the seek operation of the pick-up 33, the CPU 64 sends a seek-end signal to the host computer 70 via the I/F 16.

At a step S106, the CPU block 71 of the host computer 70 checks whether the seek-end signal is received. If it is received, the procedure goes to a step S107. If it is not received, the procedure goes back to the step S106 so that the CPU block 71 waits until the seek-end signal is received.

At the step S107, the CPU block 71 reads one logical block of data from the HDD 21 by using a DOS command for a file operation, and sends it to the CD-R drive 61 via the I/F 24. The one logical block of data transferred to the CD-R drive 61 is supplied to the buffer 65 via the I/F 16, and is stored therein from a top of a free space.

At a step S108, the CPU block 71 checks whether the buffer 65 is full, based on buffer information sent from the CPU 64 of the CD-R drive 61. If the buffer 65 is full, the CPU block 71 waits until a free space for one logical block is created.

At the step S109, the CPU block 71 checks whether the predetermined number of logical blocks have been transferred. If the transfer of the predetermined number of logical blocks is not yet completed, the procedure goes back to the step S107. Then, a next logical block is transferred. If the transfer of the predetermined number of logical blocks is completed, this is the end of the procedure.

On the side of the CD-R drive 61, the CPU 64 gives a write-start command to the encoder 63 after the completion of the seek operation of the pick-up 33.

As described above, the host computer 70 starts transferring data to the CD-R drive 61 before the completion of the seek operation. Thus, at the completion of the seek operation, the buffer 65 holds data of a plurality of logical blocks comprised of the path table, the user data, and so forth The encoder 63 which has received the write-start command from the CPU 64 reads data from the buffer 65 by an amount equal to the logical block length indicated by the CPU 64.

The encoder 63 modulates the data read from the buffer 65 along with subcode data for one sector to generate modulated data. Then, the encoder 63 adds the frame synchronizing signal to the modulated data for every 588 channel bits, and supplies it to the pick-up 33.

When the logical block length is shorter than 2048 bytes, the encoder 63 generates a series of "0"s so as to fill them into a remaining portion of the sector before the data is modulated.

In this manner, the path table data and the following user data are written into the optical disk 31 sector by sector by a unit of the logical block length. Here, the data is recorded consecutively from a first sector for recording the path table to a last sector for recording the user data.

After completion of writing the logical blocks of the quantity indicated by the data-writing command, the CPU 64 gives a stop command to the encoder 63, so that data writing into the optical disk 31 is ceased.

Here, the buffer 65 is given an enough capacity to carry out its operation by taking into account, for example, the time length required for reading data from the HDD 21 in the host computer 70.

As described above, according to the embodiment of the second principle, the data-transfer rate from the host computer 70 to the CD-R drive 61 is measured by using software, and the logical block length for one sector of the optical disk 31 is determined based on the data-transfer rate obtained above in order to adjust the recording rate of the CD-R drive 61. Thus, the recording rate of the CD-R drive 61 can be readily matched with the data-transfer rate from the host computer 70 to the CD-R drive 61. This leads to realization of the CD-R drive which does not require the special-purpose HDD for serving as a data buffer.

Since the measurement of the data-transfer rate and the determination of the logical block length are automatic processes based on the software, there is no need to obtain information on a performance of the CPU block 71 of the host computer 70, a performance of the HDD 21, and a storage capacity of the HDD 21, etc. Thus, the logical block length can be determined quite easily.

Even when the CPU block 71 of the host computer 70 has a slow processing speed, the CD-R drive 61 can be suitably used with the host computer 70 by setting the logical block length to a short length.

As described above, according to the second principle, the data-recording speed of the CD-R drive can be adjusted by setting the logical block length per sector of an optical disk in accordance with the data-transfer speed of the host computer. Thus, the recording speed of the CD-R drive can be matched with the data transfer speed of the host computer, so that the data buffer such as special-purpose HDD required in the prior art CD-R drive becomes no longer necessary.

Even when the CPU block of the host computer has a slow processing speed, the CD-R drive can be suitably used with the host computer by setting the logical block length to a short length.

Figure 14:
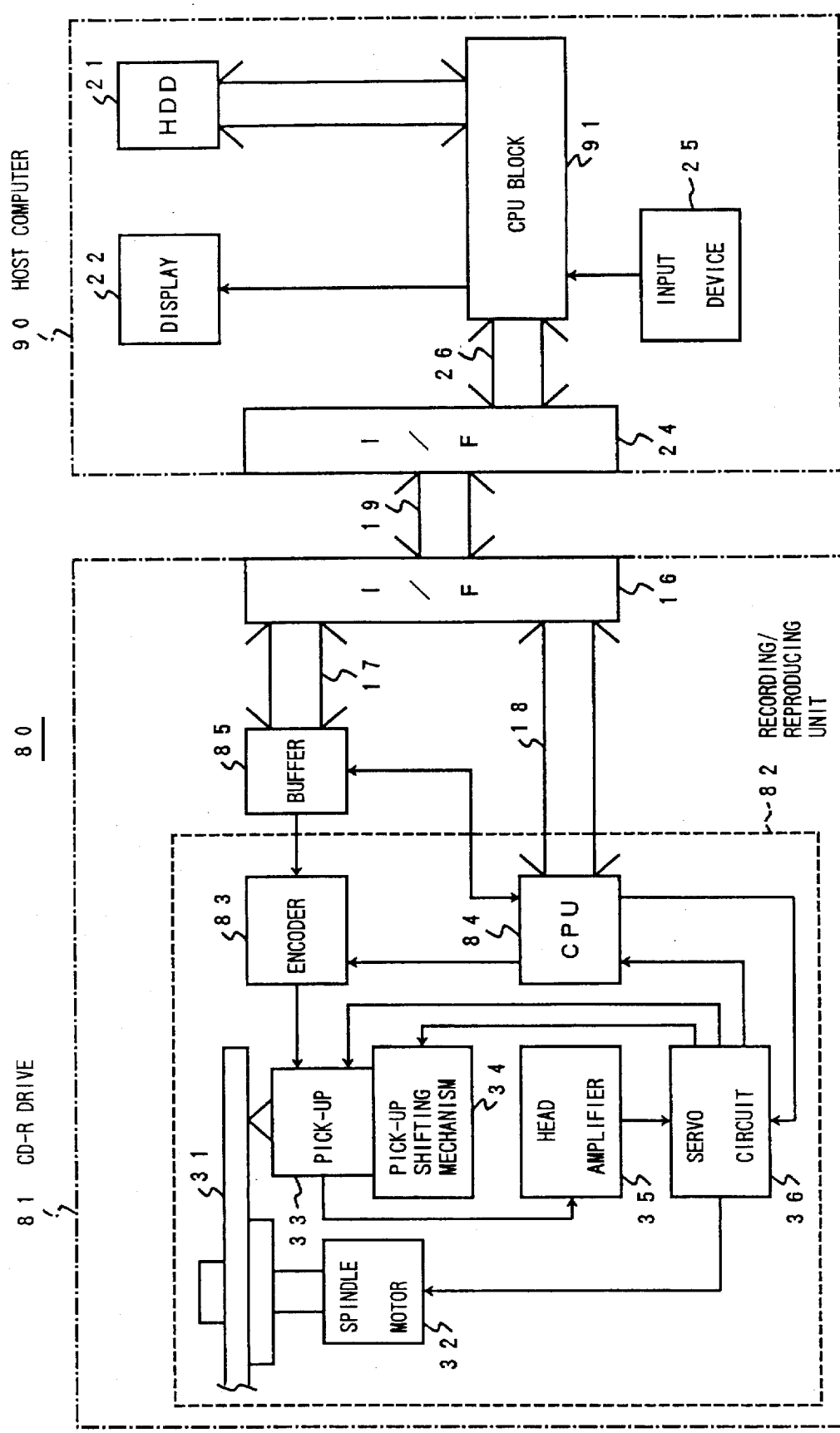
FIG. 14 is a block diagram of a CD-R disk writing device of an embodiment according to a third principle of the present invention.

FIG. 14 shows a block diagram of an embodiment of a third principle of the present invention. In FIG. 14, the elements same as those of FIG. 2 are referred by the same numerals, and a description thereof will be omitted.

According to the third principle, a host computer connected to a CD-R drive generates auxiliary data, and sends data comprised of user data and the auxiliary data to the CD-R drive in an order in which the data is written into an optical disk. Thus, the CD-R drive does not have to carry out complex processes for generating the auxiliary data at a right timing in a realtime. This leads to the CD-R drive having a smaller control unit and, thus, to the CD-R drive being less costly.

In FIG. 14, a CD-R disk writing device 80 includes a CD-R drive 81 and a host computer 90. According to commands given by the host computer 90, the CD-R drive 81 carries out data-recording/reproducing processing for the optical disk 31 which can store a large amount of information.

In FIG. 14, only the elements which are concerned with data-recording processing are shown.

The CD-R drive 81 includes a recording/reproducing unit 82, a buffer 85, and the I/F 16.

The recording/reproducing unit 82 includes the optical disk 31, the spindle motor 32 for rotating the optical disk 31, and the pick-up 33 for recording/reproducing information by illuminating a laser beam on to a desired track of the optical disk 31. The recording/reproducing unit 82 further includes the pick-up shifting mechanism 34 for moving the pick-up 33 in a radial direction of the optical disk 31, and the head-amplifier 35 for converting signals reproduced by the pick-up 34 into signals of a predetermined level.

The recording/reproducing unit 82 further includes the servo circuit 36, an encoder 83, and a CPU 84. The servo circuit 36 generates a wobble servo signal for controlling the spindle motor 32, and controls a position of the pick-up 33. The CPU 84 controls operations of the recording/reproducing unit 82.

The buffer 85 has a predetermined amount of a data storage capacity, and temporarily stores data provided from the host computer 90. The buffer 85 includes a user data area for storing user data and a subcode area for storing subcode data. The buffer 85 may be of a FIFO memory. In the case of the FIFO memory, the encoder 83 reads data from the buffer 85 in an order in which the data from the I/F 16 is stored into the buffer 85.

The encoder 83 modulates the data from the buffer 85 by using an EFM (eight-to-fourteen modulation) in accordance with predetermined standards, and, then, supplies modulated data to the pick-up 33.

The CPU 84 has ROM and RAM, and is connected with the I/F 16 through the signal lines 18 and with the buffer 85 through control lines.

The servo circuit 36 generates tracking signals and focusing signals based on the reproduced signals provided by the pick-up 33 through the head-amplifier 35, and provides these signals for the pick-up 33. Also, the servo circuit 36 generates the wobble servo signals, and provides it for the spindle motor 32. By using these signals, the pick-up 33 can follow a track on the optical disk 31, and the spindle motor 32 can rotate the optical disk 31 such that a linear velocity of the optical disk 31 with regard to the pick-up 33 is kept constant.

The host computer 90 includes the HDD 21, the display 22, a CPU (central processing unit) block 91, the I/F 24 for handling interface with the CD-R drive 81, and the input device 25 such as a keyboard and the like.

The CPU block 91 has CPU, ROM, and RAM, and, also, is provided with an interface circuit for handling the input device 25, the display 22, and the HDD 21. The CPU block 91 and the I/F 24 are connected with each other through the signal lines 26, which are comprised of a data bus and control lines.

The I/F 24 is connected with the I/F 16 of the CD-R drive 81 through signal lines 19, which are comprised of a data bus and control lines. Here, such a standard as SCSI (small computer system interface) may be used for the I/F 16 and the I/F 24. A personal computer commonly used can serve as the host computer 90.

FIG. 15 shows a flowchart of a process of transferring data from the host computer 90 to the CD-R drive 81. The transfer of the data is carried out by the CPU block 91 based on software stored in the HDD 21.

The software is read from the HDD 21, and is stored into the RAM of the CPU block 91.

In FIG. 15, a step S203 is a step for generating auxiliary data comprised of the subcode data and the block header, and steps S204 through S207 are steps for transferring the user data and the auxiliary data to the CD-R drive 81.

The HDD 21 stores the user data which is to be written into the optical disk 31. For example, if the user data is music pieces for the CD-DA, the user data is divided into the music pieces and indexes. If the user data is data for the CD-ROM, it is divided into files.

Here, 2352 bytes of data within one subcode frame is treated as one block data.

In FIG. 15, at the step S201, the CPU block 91 of the host computer 90 issues a command ordering that a requested number of blocks of data be written into the optical disk 31 of the CD-R drive 81 at a requested location (requested subcode frame). For example, the command may be about writing 1000 blocks of data from a location of 00:02:00 (0 minute, 2 seconds, and 0 frame) in the absolute time. The data-writing command is supplied to the CPU 84 of the CD-R drive 81 via the I/F 24 and the I/F 16.

Upon receiving the data-writing command, the CPU 84 of the CD-R drive 81 controls the servo circuit 36 to move the pick-up 33 to a location (subcode frame) indicated by the data-writing command.

Just prior (e.g., one second) to completion of the seek operation of the pick-up 33, the CPU 84 sends a seek-end signal to the host computer 90 via the I/F 16. For example, if the data-writing command is about writing data from a location of 00:02:00, the seek-end signal is sent to the host computer 90 when the pick-up 33 is located at a location of 00:01:00.

At the step S202, the CPU block 91 of the host computer 90 checks whether the seek-end signal is received. If it is received, the procedure goes to the step S203. If it is not received, the procedure goes back to the step S202 so that the CPU block 91 waits until the seek-end signal is received.

Figures 3A, 3B, 3C:
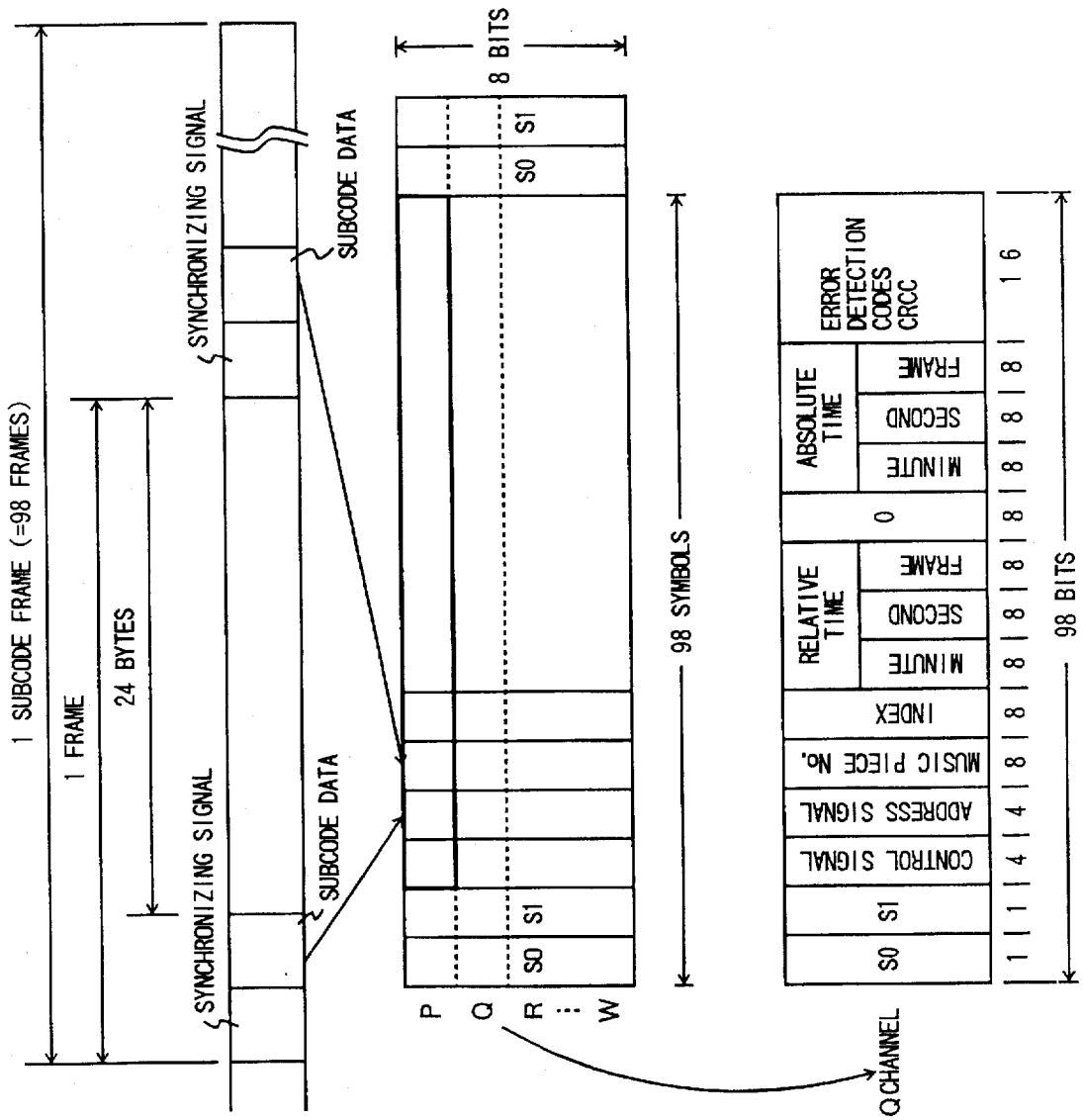
FIGS. 3A to 3C are illustrative drawing showing configurations of a subcode frame, subcode data, and a Q channel of the subcode data, respectively.
Figure 4:
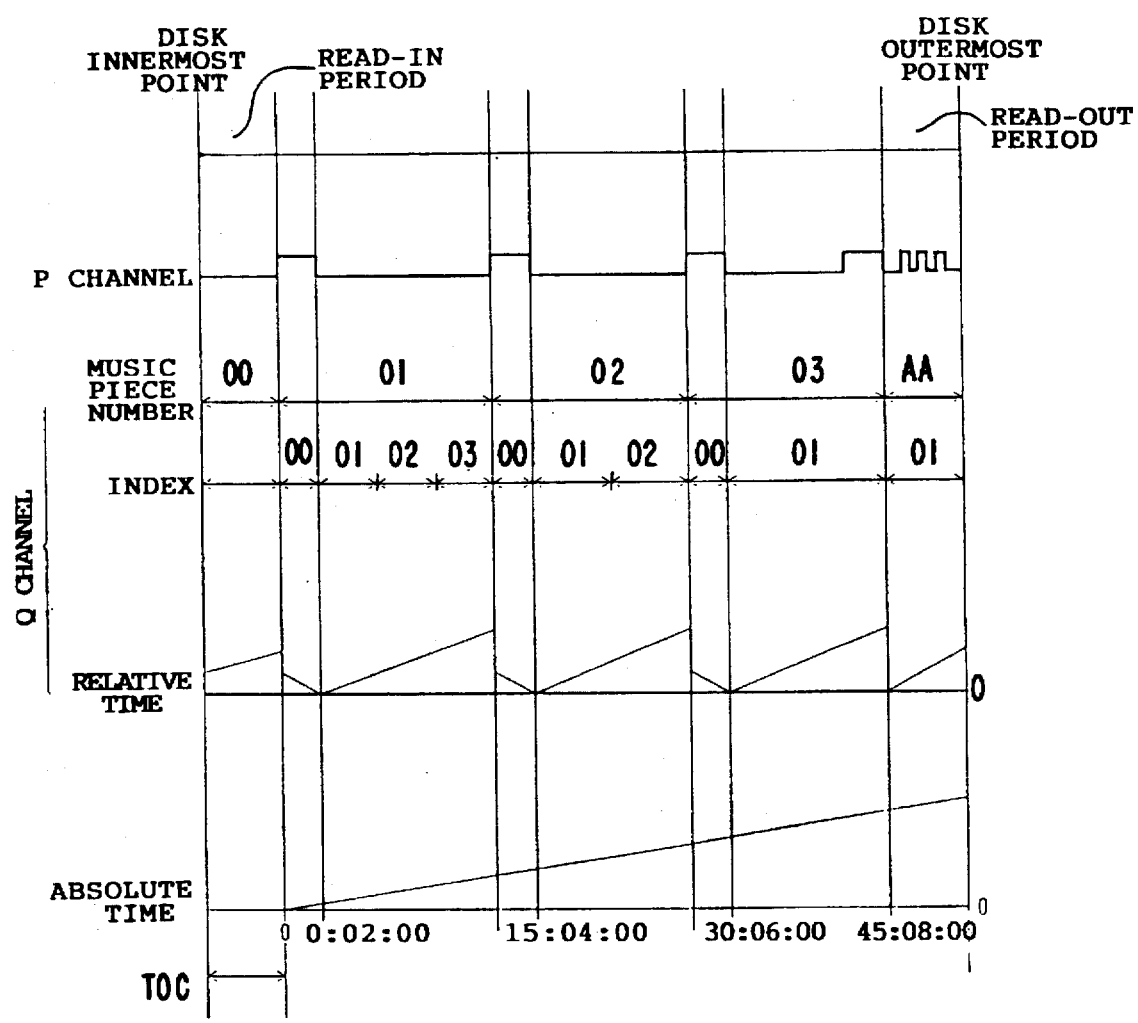
FIG. 4 is an illustrative drawing showing an example of a CD-DA in which three music pieces are recorded.
Figure 5A:
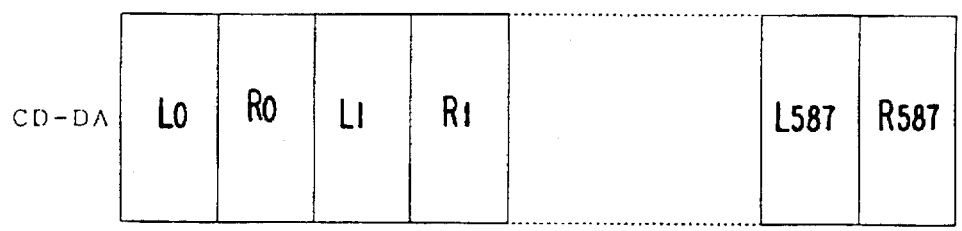
FIGS. 5A and 5B are illustrative drawings showing a data structure of one block of a CD-DA and one block of a CD-ROM mode 1, respectively.
Figure 5B:
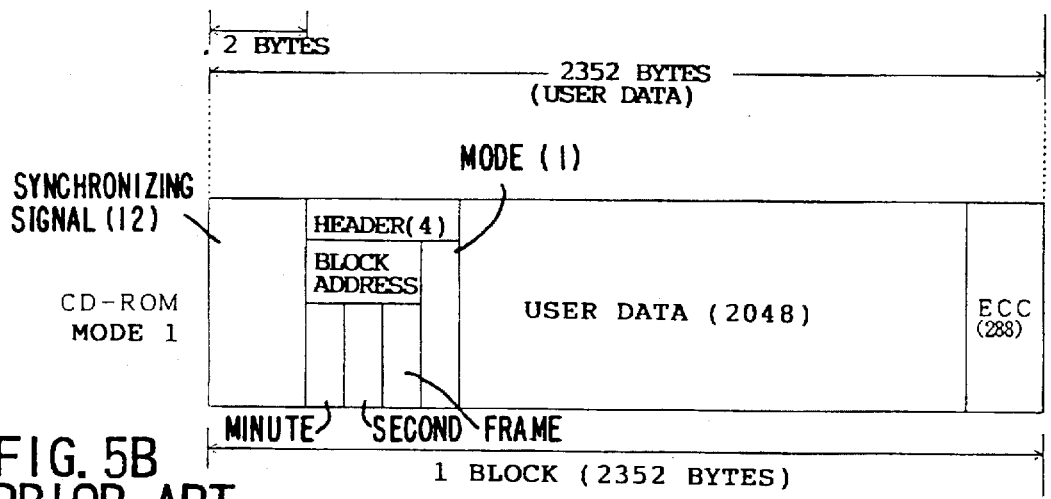

At the step S203, the CPU block 91 generates a subcode shown in FIGS. 3A to 3C and a block header (only in the case of the CD-ROM) shown in FIGS. 5A and 5B for a next block to be transferred. The generated subcode and block header are held in a predetermined area of the RAM of the CPU block 91 or in a predetermined area of the HDD 21.

The absolute time in the Q channel of the subcode can be obtained by progressively incrementing the absolute time from the start-point of the data area of the optical disk 31, i.e., from 00:00:00, as subcode frames are written one by one. The relative time in the Q channel of the subcode can be obtained by decreasing from 2 seconds to 0 seconds during the pausing period located at a start of each music piece and by incrementing in the following period. The error detection codes CRCC of the Q channel of the subcode is generated by using other data contained in the generated Q channel.

The block address of the block header is identical to the absolute time of the Q channel of the subcode. The 288 bytes of the error correction codes ECC are generated by using 4 bytes of a generated header and 2048 bytes of the user data of a block read from the HDD 21.

At the step S204 and the step S205, the block data to be written is transferred to the CD-R drive 81, as will be explained below.

Here, in the case of the CD-DA, the block data to be written is comprised of 2352 bytes of music data and subcode. In the case of the CD-ROM, the block data is comprised of the user data, the subcode, and the block header.

At the step S204, the CPU block 91 reads one block of the user data from the HDD 21 or from the RAM of the CPU block 91, and transfers it to the CD-R drive 81 via the I/F 24. In the case of the CD-DA, all the transferred data is music data. In the case of the CD-ROM, the transferred data includes the block header and the user data.

The one block of the user data or the one block of the block header and the user data which is transferred to the CD-R drive 81 is supplied to the buffer 85, and is stored into the user data area thereof from the top of a free space following previously transferred data.

At the step S205, the CPU block 91 reads the subcode data of 98 bytes for one block, and sends it to the CD-R drive 81 via the I/F 24. The subcode data transferred to the CD-R drive 81 is supplied to the buffer 85 via the I/F 16, and is stored into the subcode area thereof from the top of the free space.

At the step S206, the CPU block 91 checks whether the buffer 85 is full, based on buffer information sent from the CPU 84 of the CD-R drive 81. If the buffer 85 is full, the CPU block 91 waits until a free space for one block is created.

At the step S207, the CPU block 91 checks whether the requested number of blocks have been transferred. If the transfer of the requested number of blocks is not yet completed, the procedure goes back to the step S203. Then, the generation of the subcode data and the block header and the transfer of the data is repeated for a next block. If the transfer of the requested number of blocks is completed, this is the end of the procedure.

On the side of the CD-R drive 81, the CPU 84 gives a write-start command to the encoder 83 after the completion of the seek operation of the pick-up 33.

As described above, the host computer 90 starts transferring data to the CD-R drive 81 before the completion of the seek operation. Thus, at the completion of the seek operation, the user data and the block headers for a plurality of blocks are stored in the user data area of the buffer 85 in an order in which they are to be written into the optical disk 31. The subcode area of the buffer 85 stores the subcode data for the plurality of the blocks in an order in which it is written into the optical disk 31.

The encoder 83 which has received the write-start command from the CPU 84 reads the data from the buffer 85 in an order in which the data is written into the optical disk 31.

The user data area and the subcode area of the buffer 85 now have a free space equal to the amount of the data which have been read out by the encoder 83. The encoder 83 modulates the data read from the buffer 85 in synchronism with the synchronizing signal. Then, the encoder 83 adds the frame synchronizing signal to the modulated data, and supplies it to the pick-up 33. The pick-up 33 writes the data into the track of the optical disk 31.

After completion of writing the blocks of a quantity indicated by the data-writing command, the CPU 84 gives a stop command to the encoder 83, so that data writing into the optical disk 31 is ceased.

In the case of the CD-DA, when blocks of the user data is finished to be written, data for the read-out period is transferred to the CD-R drive 81, and is written into the optical disk 31. After completion of the writing of the read-out period, the TOC data is written into the read-in period of the optical disk 31.

Here, a program area can be provided preceding to the TOC area, and can record information about a status of data writing for the optical disk 31. With the use of this information, the data-writing process for the optical disk 31 can be divided such that each data-writing is conducted at separate times.

In the case of the CD-ROM, necessary information such as the path table for indicating a file arrangement and the like is recorded at the beginning of the data area.

Here, the buffer 85 is given an enough capacity to carry out its operation by taking into account, for example, the time length required for reading data from the HDD 21 in the host computer 90.

In the embodiment of the third principle of the present invention, the data-transfer rate from the host computer 90 to the CD-R drive 81 is assumed to be higher than a rate at which the encoder 83 reads data out from the buffer 85. This can be accomplished by using the first principle or/and the second principle described earlier.

As described above, in the embodiment of the third principle, the host computer 90 generates the subcode and the block header, and transfers the user data, the subcode, and the block header to the CD-R drive 81 in an order of writing data into the optical disk 31. Thus, the CPU 84 of the CD-R drive 81 does not need to carry out complex processes for generating the subcode and the block header at a right timing in realtime.

Accordingly, the memory volume required for the ROM and the RAM of the CPU 84 can be reduced compared to those of the prior art. This leads to a cost of the CD-R drive 81.

Also, the CD-R drive 81 receives and modulates the data which is generated by the host computer 90 in accordance with a disk format of the optical disk 31. Thus, even when the disk format of the optical disk 31 is changed, there is no need to change specifications of the CD-R drive 81. The change in the disk format can be coped with by an appropriate change in the software which controls the generation of the subcode and the block header and the transfer of the data. Thus, various disk formats such as the CD-DA, the CD-ROM mode 1, the CD-ROM mode 2, and CD-G can be appropriately handled.

For example, software programs for various disk formats may be stored in the HDD 21 in advance. Then, when the host computer 90 is started up, a program corresponding to a disk format of the optical disk 31 may be read from the HDD 21.

Compared to the CD-R disk writing device of the prior art, there is an increase in the load on the host computer 90 of the third principle, since the host computer 90 has to generate the subcode and the block header and is responsible for the management of frame locations at which the subcode data and the block header is attached to the user data. However, since personal computers have a high performance nowadays, they can be used as the host computer 90 without any problems with regard to a processing speed, memory volume, and the like.

As described above, according to the third principle of the present invention, the host computer connected to a CD-R drive generates the auxiliary data, and sends data comprised of the user data and the auxiliary data to the CD-R drive in an order in which the data is written into the optical disk. Thus, the CD-R drive does not have to carry out complex processes for generating the auxiliary data at a right timing in realtime. This leads to the CD-R drive having a smaller control unit and, thus, to the CD-R drive being less costly.

Also, the CD-R drive receives and modulates the data which is generated by the host computer in accordance with a disk format of the optical disk. Thus, various disk formats can be appropriately handled without changing the specifications of the CD-R drive.

Further, the present invention is not limited to these embodiments, but various variations and modifications may be made without departing from the scope of the present invention.

What is claimed is:

1. A compact, less expensive optical disk writing device comprising:
    an optical disk drive recording data into an optical disk, wherein said data includes auxiliary data when said data is recorded; and
    a host computer generating said auxiliary data including block headers and subcode data by using a general-purpose CPU of said host computer, and transferring said data including said auxiliary data to said disk drive so that said data transferred to said optical disk drive is ready to be recorded.

2. The optical disk writing device as claimed in claim 1, wherein said optical disk drive comprises:
    a buffer storing a predetermined amount of said data including said auxiliary data; and
    an encoder modulating said data including said auxiliary data prior to said recording.

3. The optical disk drive used in the optical disk writing device as claimed in claim 1.

4. The optical disk drive used in the optical disk writing device as claimed in claim 2.

5. A method of recording formatted data into an optical disk, which formatted data includes user data and auxiliary data, said user data being transferred from a host computer to an optical disk drive having said optical disk, said method comprising the steps of:
    generating said auxiliary data including block headers and subcode data in said host computer by using a general-purpose CPU of said host computer;
    attaching said auxiliary data to said user data so as to generate said formatted data in said host computer;
    transforming said formatted data from host computer to said optical disk drive; and
    recording said formatted data into said optical disk;
    wherein said auxiliary data contains information regarding management of data in said optical disk.

* * * * *